H. W. LUDLAM.
FRICTION CLUTCH.
APPLICATION FILED SEPT. 25, 1914.
1,166,379.
Patented Dec. 28, 1915.
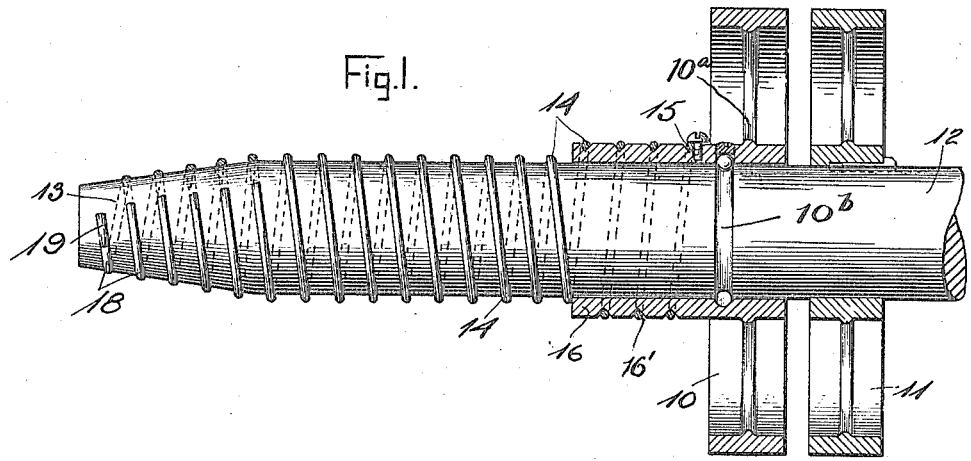
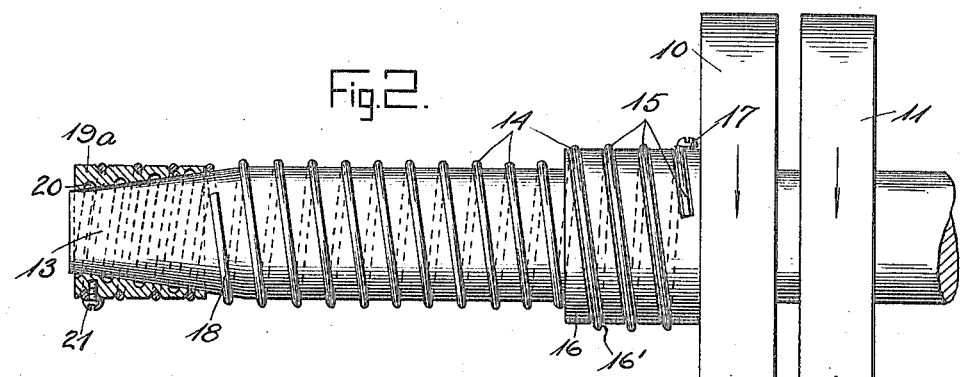
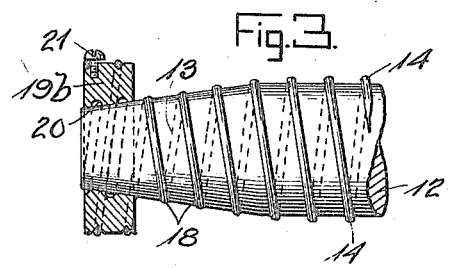
WITNESSES
INVENTOR
Harry W. Ludlam
BY
ATTORNEYS

UNITED STATES PATENT OFFICE.

HARRY W. LUDLAM, OF BAYONNE, NEW JERSEY.

FRICTION-CLUTCH.

1,166,379.

Specification of Letters Patent.

Patented Dec. 28, 1915.

Application filed September 25, 1914. Serial No. 863,454.

*To all whom it may concern:*

Be it known that I, HARRY W. LUDLAM, a citizen of the United States, and a resident of Bayonne, in the county of Hudson and State of New Jersey, have invented a new and Improved Friction-Clutch, of which the following is a full, clear, and exact description.

This invention relates to transmission of power, and has particular reference to improved devices for intermittently connecting driving and driven members.

Among the objects of the invention is to provide a novel form of friction clutch which acts quickly and effectively to make driving connection between two principal members, providing a certain amount of resiliency between the members as is desirable in many instances, and providing a direct release for relatively reverse movement of the driving member in a noiseless manner.

The foregoing and other objects of the invention will hereinafter be more fully described and claimed and illustrated in the drawings forming a part of this specification in which like characters of reference indicate corresponding parts in all the views, and in which—

Figure 1 is a longitudinal section of one form of the invention, parts being in elevation; Fig. 2 is a similar view covering a modification, but indicating the driving and driven wheels in elevation; and Fig. 3 is a still further modification.

The several parts of this device may be made of any suitable materials, and the relative sizes and proportions, as well as the general design of the mechanism, may be varied to a considerable extent without departing from the spirit of the invention hereinafter more fully described and claimed.

Referring more particularly to the drawings, I show two rotary elements indicated as in the form of band wheels 10 and 11, and for the purpose of this specification the former will be regarded as the driving member or wheel and the latter as the driven member, the direction of movement being indicated by arrows on Fig. 2. It is obvious, however, that either wheel may be regarded as the driving member and the other as the driven member with a corresponding variation in the direction of movement.

At 12 I show a shaft to which the driven wheel is keyed or otherwise secured.

The driving member 10 may be located at any desired place with respect to the driven wheel and is preferably coaxial therewith. As shown herein, the driving member is mounted loosely upon the shaft 12 between the driven member and the end 13 of the shaft. Since this driving member is mounted loosely, it, considered alone, is free to rotate in either direction around the shaft, and any suitable means, such as a ball $10^a$ operating in a groove $10^b$ may be provided to prevent longitudinal movement thereof along the shaft.

At 14 I show a coil spring having one end 15 rigidly but adjustably connected to a hub extension or flange 16 of the driving member. To facilitate this connection in a reliable manner, I prefer to employ a groove 16' of spiral form around the outer surface of this hub extension 16. The end 15 of the coil is shown gripped at the desired effective length by means of a set screw 17 adjacent said spiral groove. The main portion of the coil 14 fits loosely around the shaft 12, and the individual coils are preferably spaced each to each as shown in the drawings. The free end 18 of the coil is shown made thinner, or tapered in cross section, than the main portion. The exact form of the metal of the coil, however, is immaterial. The extreme free end portion of the coil is so formed as to normally grip the shaft comparatively lightly, the gripping effect being practically negligible when the driven member is running ahead of the driving member or when the driving member is running in a reverse direction. In other words, when the driving member 10 is operated relatively rearwardly, the entire coil turns with it freely, having no effect whatever upon the driven member. When, however, the driving member 10 is rotated forwardly, the slight frictional contact between the extreme free end turn of the spring is sufficient to initiate the gripping of the entire coil or so much of it as is necessary to cause a positive driving action between the driving member and the shaft. In other words, the slight gripping effect of the first turn of the spring is sufficient to cause the next turn or coil to grip the shaft, and the combined gripping action of the first two coils will then insure the third and so on until the clutch becomes effective. Obviously there will be a certain amount of resiliency inherent in the spring element. There will be, however, no very great rotary sliding action between the free end of the coil and the driven member.

The end 13 of the shaft is preferably tapered in the form of a frustum of a cone, and the free end portion of the spring embraces the conical portion of the shaft. Auxiliary to the aforesaid automatic accelerating gripping action of the successive coils of the spring, the action of the spring in tightening for driving purposes has a tendency to cause the conical portion of the spring to approach the driving member somewhat in the nature of a thimble or sleeve crowding up toward the base portion of the conical form; hence the frictional engagement between the spring and the shaft is materially increased by this special shape of shaft. The reason for forming the extension 16 on the hub of the loose wheel 10, providing for the rotary adjustment of the fixed end of the spring thereof, is to vary the effective length of the spring or the frictional contact between the spring and shaft due to the aforesaid conicity.

At 19 I show a weight formed at or upon the extreme free end of the spring. In some instances this weight may take the form of a sleeve as indicated at 19$^a$, but in any event, irrespective of the size or form thereof, the weight constitutes an inertia member which, when at rest, will tend to resist the tendency of the spring to rotate with the driving member, and hence the inertia member facilitates or hastens the gripping action of this end of the spring.

In Fig. 3 I show a construction in which several of the above mentioned features are combined. That is to say, the tapered end 18 of the spring 14 coöperates with the conical end 13 of the shaft 12, and the inertia member 19$^b$ to which the extreme free end of the spring 14 is connected acts both to temporarily retard the rotation of the free end of the spring and to increase the frictional contact by its tendency to crowd up upon the flared portion of the shaft. The inner surface of either of the inertia members 19$^a$ and 19$^b$ is preferably provided with a spiral groove or channel 20. The direction in which this groove extends spirally corresponds to the direction in which the spring is coiled, and hence the rotation of the inertia member or its tendency to rotate due to the driving action of the driving member serves to cause or tend to cause the inertia member to act as a nut and thereby crowd up toward the base portion of the conical end 13. The otherwise free end of the coil may be secured to the clutch member 19$^a$ or 19$^b$ in any suitable manner as by means of a set screw 21.

Since the spring 14 is coiled in the direction of movement of the driving member and between the conical end 13 of the driven member and said driving member, the inclination of each coil with respect to the shaft around which it is coiled is such as to cause the several coils to creep toward the driving member while the clutching action is taking place, and this creeping effect has a tendency to materially increase the grip between the conical end of the shaft and the conical portion of the spring. In other words, the direction of coil of the spring and the rotation of the movable parts of the spring tend to cause the free end of the spring to act like a thimble wedging upwardly upon the tapered end of the shaft. This action is facilitated by the fact that the individual coils of the spring are spaced from one another.

I claim:

1. The combination of a rotary driving member, a driven member, a coil spring secured at one end to the driving member, the other end of the spring being free and having only light frictional contact with the driven member, and an inertia member connected to the free end of the spring adjacent the driven member.

2. In a friction clutch, the combination of a driven shaft, a driving member therefor journaled loosely upon the shaft for rotation in either direction thereon relatively, and a coil spring secured at one end to the driving member, the remainder of the spring having loose embracing relation with the shaft between the end of the shaft and the driving member, the end of the shaft being tapered and the adjacent free end of the spring being similarly tapered for coöperation therewith.

3. In a friction clutch, the combination of a shaft, a loose rotary member journaled thereon remote from the end of the shaft, the end of the shaft being tapered, and a coil spring surrounding the shaft between said end and said rotary member, one end of the spring being secured rigidly to the rotary member, and the other end being tapered for coöperation with the tapered end of the shaft, the portion of the spring adjacent the tapered portion of the shaft having light frictional contact with the shaft.

4. In a friction clutch, the combination of a shaft, a rotary member journaled freely thereon and having a hub extending laterally therefrom and formed with an exterior spiral groove, a spring detachably connected to the rotary member in said exterior groove, the main portion of the spring surrounding the shaft between the extension of the rotary member and the end of the shaft, the extreme end of the spring having light frictional contact with the shaft and provided with an enlargement serving as an inertia member.

5. In a friction clutch, the combination of a shaft having a conical end, driving and driven wheels adjacent each other upon the shaft, the driving wheel being loose thereon and the other being fixed thereon, and a spring adjustably secured to the driving wheel and extending thence toward the conical end of the shaft and loosely embracing the same, one portion of the spring having a conical configuration embracing and conforming to said conical end of the shaft.

6. In a friction clutch, the combination of a shaft having a cylindrical portion and a conical end, a driving wheel journaled upon the cylindrical portion of the shaft and normally loose thereon, and a spring secured at one end to said driving wheel, the main portion of the spring extending thence around and along the shaft and having its free end portion embracing the conical portion of the shaft.

7. In a friction clutch, the combination of a shaft having a tapered end, a driving member journaled normally loosely upon the shaft, a coil spring adjustably secured at one end to said driving member, the main portion of the spring extending thence around and along the shaft and having its free end portion conforming to and embracing the tapered portion of the shaft, and an inertia member carried by the free end of the spring adjacent the tapered end of the shaft.

8. In a friction clutch, the combination of a shaft having a tapered end, a driving member journaled loosely upon the shaft, means to hold the driving member from longitudinal movement on the shaft, and a coil spring surrounding the shaft and connected rigidly at one end to the driving member, the other end of the spring embracing and conforming to the tapered end of the shaft, the several coils of the spring being spaced from one another and serving to cause the tapered portion of the spring to grip upon the tapered portion of the shaft, substantially as set forth.

In testimony whereof I have signed my name to this specification in the presence of two subscribing witnesses.

HARRY W. LUDLAM.

Witnesses:
Geo. L. Beeler,
George H. Emslie.